Figure 1:
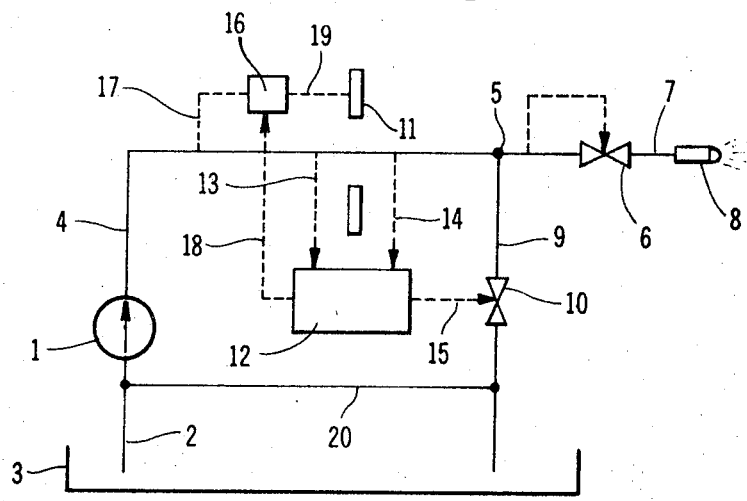

United States Patent [19]
Hansen et al.

[11] 3,744,508
[45] July 10, 1973

[54] PRESSURE-REGULATING VALVE, PARTICULARLY FOR FUEL-OIL PUMPS

[75] Inventors: Gunnar Lyshoj Hansen; Jorgen Hartvig Petersen, both of Nordborg, Denmark

[73] Assignee: Danfoss A/S, Nordberg, Denmark

[22] Filed: Aug. 5, 1969

[21] Appl. No.: 847,638

[30] Foreign Application Priority Data
Aug. 3, 1968   Germany.................. P 17 73 985.4

[52] U.S. Cl............................ 137/116.3, 137/117
[51] Int. Cl. ............................................ G05d 7/01
[58] Field of Search.................. 137/108, 116.3, 117

[56] References Cited
UNITED STATES PATENTS

| | | | |
|---|---|---|---|
| R25,391 | 5/1963 | Farkas | 137/117 |
| 3,011,506 | 12/1961 | Schwartz | 137/108 |
| 3,446,231 | 5/1969 | Magnusson | 137/117 X |

*Primary Examiner*—Robert G. Nilson
*Attorney*—Wayne B. Easton

[57] ABSTRACT

The invention relates to a pressure regulating valve assembly for pumps. The assembly includes two relatively movable pistons with one being a setting piston acted upon by supply pressure and a rated spring and the other being a regulating piston which controls a return orifice and is acted upon by the supply pressure and a differential spring. The supply pressure for the regulating piston is delivered through a modulated restrictor passage with the pressure drop in the restrictor passage corresponding to the quantity of pressurized fluid delivered therethrough. The regulating piston is hydraulically loaded by only a differential pressure which provides a greater ease in movement and allows a relatively weak differential spring to be utilized.

21 Claims, 4 Drawing Figures

PRESSURE-REGULATING VALVE, PARTICULARLY FOR FUEL-OIL PUMPS

The invention relates to a pressure-regulating valve, particularly for fuel-oil pumps, which valve is incorporated in a return pipe branching from the pressure pipe behind a restrictor, and comprises a piston arrangement which overrides a return orifice and is loaded by the supply pressure and a rated spring.

The function of pressure-regulating valves is to keep the pressure of a fluid to be fed to a consumer unit approximately constant. In heating systems which are powered by a fuel-oil pump acting as a positive-displacement pump, it is known to keep the pressure constant by passing the surplus oil back to the pump or to the sump with the help of the pressure-regulating valve.

In the known constructions, the pressure-regulating valve has its own piston, which is acted upon on one side by the supply pressure and is backed on the other side by a rated spring.

The piston overrides a return orifice which opens to an extent depending upon the level of the supply pressure. It has been found that a piston of this kind, even when very carefully machined and fitted in its cylinder, often tends to jam and does not therefore completely perform its regulating function.

Also known, in combination with a pressure-regulating valve of this kind, is a cut-off valve for fuel-oil pumps which is fitted in the delivery pipe running to the nozzle and which is actuated in dependence upon the pressure-drop at a restrictor fitted in the pump pressure pipe in front of the point at which the return pipe branches off.

The object of the invention is to provide a pressure-regulating valve of the initially stated kind which is able to respond to all fluctuations in pressure in a considerably simpler manner and tends to jam to a very much less extent.

According to the invention, this object is achieved by the piston arrangement comprising two pistons, movable relatively to each other, namely a setting piston, acted upon by the supply pressure and the rated spring, and a regulating piston, which overrides the return orifice and is acted upon by the supply pressure, the pressure behind the restrictor and a differential pressure spring.

In such a construction, the pressure drop at the restrictor corresponds to a certain quantity of oil delivered; if this quantity is too great, the regulating valve must discharge a prescribed excess quantity in order for the pressure in the delivery pipe to remain constant. Since the regulating piston is hydraulically loaded only by a differential pressure, the differential pressure spring can be considerably weaker than the rated spring. This alone results in greater ease of movement. The regulating piston is also acted upon at both end-faces by fluid, the pressure of which differs to only a slight extent. Consequently, fluid penetrates into the circumferential gap from both sides, so that, in contrast to the known pistons acted upon by fluid on one side only, the entire circumferential gap is filled with fluid in a reliable manner and is thus lubricated to a certain extent. Furthermore, asymmetry in the gap, which can easily lead to jamming in the case of pistons hydraulically loaded on one side only, is largely balanced out by the double-sided hydraulic loading arrangement. This double-sided loading is possible as a result of dividing the piston system into a setting piston and a regulating piston, as well as being due to the metering principle employed, incorporating a restrictor. The pressure-regulating valve of the invention has other advantages which will be explained in the following description.

It is of considerable advantage if the restrictor is variable in dependence upon the movement of at least the setting piston. In this way, the setting piston takes over the coarse adjustment of the pressure range, whereas the regulating piston serves for providing fine regulation. A valve of this kind can be automatically adapted for use with nozzles of different sizes.

In a preferred construction, the setting piston and the regulating piston are arranged coaxially, their mutually presented end-faces are exposed to the supply pressure, and the rated spring and differential pressure spring engage, respectively, those of their end-faces facing away from each other; furthermore, the two pistons overlap in the supply pressure range, and there together form the restrictor. In this arrangement, not only is a compact construction obtained, but the restrictor, dependent upon the two pistons, results in a particularly fine control.

In a further aspect of the invention, the regulating piston forms the closure member of a cut-off valve in the delivery pipe and can be pressed on to its seat by the rated spring. Thus, an extremely large closing force is available for the cut-off valve at no additional cost. Nevertheless, the cut-off valve is relieved of load by the rated spring during operation, since this is compressed by the setting piston.

Special advantages accrue if the regulating piston consists of a first regulating element, overriding the return orifice, and a second closure element forming the closure member, which elements are coupled to move substantially in synchronism, but are movable relatively to each other in the axial direction in such a way that the closure elements can also be driven by the rated spring independently of the regulating element. In this way, it becomes possible to close the cut-off valve suddenly at a given moment, even if this causes some variations in the pressure conditions on the two sides of the regulating piston that impede its closing movement. This applies, for example, when the closure element, upon closing of the cut-off valve, seeks to displace fluid from the chamber behind the restrictor; the regulating piston can respond at the excess pressure here occurring and can discharge the fluid by way of the return pipe.

In a very simple form of the coupling, the closure element has a stop whereby it is pressed, in the direction for opening, against an end face of the regulating element by a drive spring. When this occurs, the two elements follow each other as long as the rated spring does not overcome the force of the drive spring.

Furthermore, in this arrangement it is expedient if the end-face is constituted by a sealing disc having a degree of resilience such that neither the seal nor the movement is adversely affected during the relative movements occurring between the closure and regulating elements in normal operation. Since, during normal operation, the regulating element undergoes displacement in the order of magnitude of only tenths of a millimetre, the regulating element can meet these requirements without the mass of the closure element having to be moved along at the same time, so that a still finer degree of regulation is achieved.

Advantageously, the relative movement between the setting piston and the closure element is braked by a damping device. Upon occurrence of the sudden closing movement, the force of the rated spring is therefore immediately transmitted to the closure element irrespective of the particular relative positions of this element and the setting piston. Also, however, there is no difficulty in gradually changing the relative positions of these two parts, which alteration can occur in normal operation.

Furthermore, the damping device is provided by the closure element engaging, by an end formed as a cylinder, in a hollow cylinder formed on the setting piston and tightly sealed at its base, the space adjoining the base being capable of being filled with oil by way of a throttle. Here, the damping device is formed with the help of components already present.

The advantages of the damping device apply particularly if the adjustable restrictor is formed between the closure element and the setting piston. Pressure fluctuations of short duration do not therefore lead to a change in the restrictor orifice.

If the restrictor is formed on the cylinder and the hollow cylinder, and the circumferential gap extending from the restrictor to the chamber in the bore constitutes a throttle, filling of said chamber with fluid is ensured.

The base of the hollow cylinder can be formed by a perforated sealing disc which is pressed by the rated spring against an inner shoulder on the setting piston, a supporting plate being interposed. The sealing disc and the supporting plate are simple stamped components, which can be securely held on the setting piston by the rated spring. The hollow cylinder is here provided with a smooth end closure, the setting piston needs only to be bored from one side, any air that may be present can collect in the hole in the sealing disc and, furthermore, the arrangement acts as a safety-valve if the pressure in the chamber in the base is too high.

Uniform filling of the throttling circumferential gap and hydraulic balance are achieved if the cylinder has an annular groove connected with the restrictor orifice in the cylinder.

Furthermore, the regulating element can take the form of an annular piston and can surround the cylindrical closure element. This renders the construction still more compact.

In a preferred form of construction, the mutually facing end-faces of the setting piston and the regulating piston, that are subjected to the supply pressure, have the same outside diameter and the hollow cylinder of the setting piston is surrounded by a cylindrical sleeve of the regulating piston. This, in a construction of short length, provides a long sealing distance on the outside circumference of the regulating piston. There is thus no danger of air, flowing through the supply pipe, reaching the return pipe along this circumferential gap.

Also, a backing member can be associated with the regulating piston and a seal can be provided between the setting piston and the regulating piston. In the closed position, the setting piston is pressed by the rated spring against the seal held by the regulating piston and the backing member, so that along this path, too, effective blocking of the supply pressure with respect to the suction side of the pump is achieved. This effectively prevents moving air from reaching the suction side and adversely affecting the work of the pump.

This seal can be of annular form and can be pressed by the end-face of the hollow cylinder against a base surface of the regulating piston adjoining the sleeve. Here, the ring is securely held against blow-out, since even when the end-face of the setting piston is displaced, the ring is always located within the long sleeve of the regulating element.

In a further aspect of the invention, the regulating piston can even override a return orifice which communicates directly with the suction side of the pump, i.e. without there being provided a check valve or the like which is prone to cause trouble. Hitherto, a valve of this kind was necessary since in the known pressure-regulating valves, the seal between the supply side and the return side was incomplete. In the present construction, however, an excellent seal is achieved.

Furthermore, the regulating piston can override a return orifice which leads to the sump and which in single-line operation can be blocked. If two of the last-named return orifices are present, automatic change-over takes place, without any valve mechanism, depending upon whether blocking has taken place or not.

With the valve-like seals here used, e.g. on the cut-off valve, a particularly good seal is achieved if, in the case of a valve-like seal between two components, an O-ring seal is guided at its circumference by a cylindrical surface on one component, this surface overlapping the other component axially and being so positioned that the O-ring cannot fall away from the cylindrical surface even upon maximum displacement between the two parts. The problem of blow-out of such O-rings is thus overcome, since even if the ring moves away from its original position, it does not get lost, but is returned to its position when the next closing stroke takes place.

The O-ring is preferably guided on the sealing surface between the closure member and seat, on a pin fitted centrally on one component and extending into a recess in the opposite component.

Here, the pin can be pressed into a bore in the seat and can constitute at least one axial passage. This passage can be formed by grooves in the wall of the pin or of the bore, or by a central opening. Particularly advantageous is a hollow clamp pin known per se.

Figure 3:
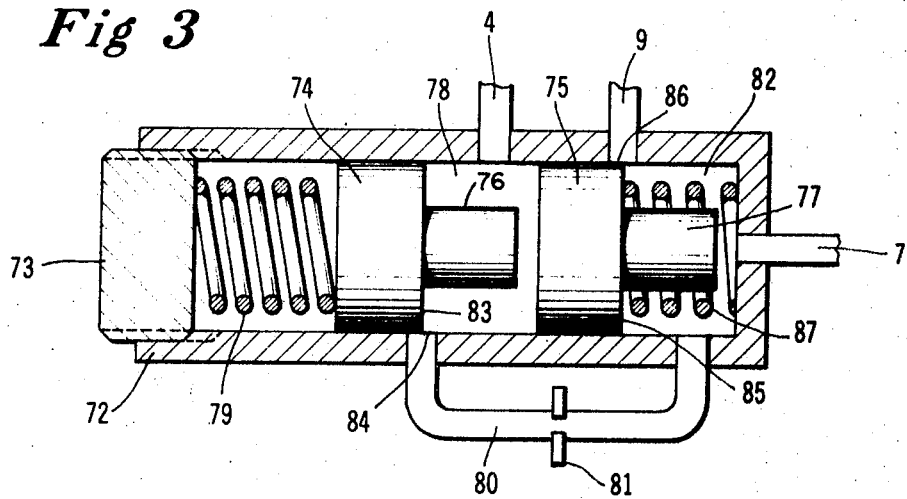
Figure 4:
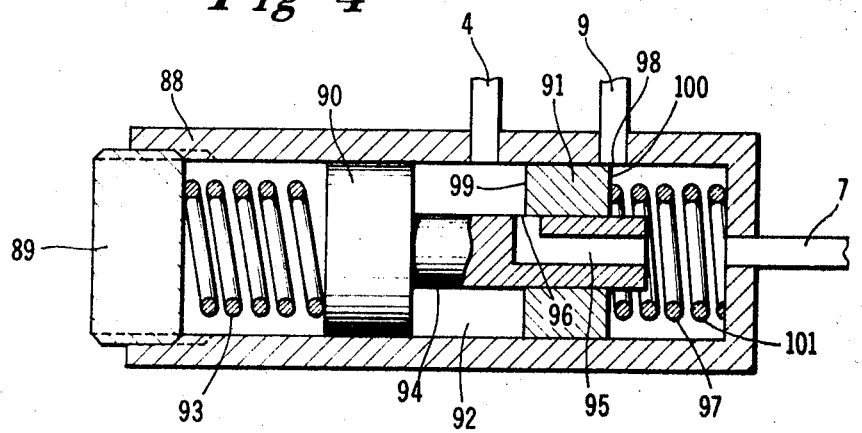
Figure 2:
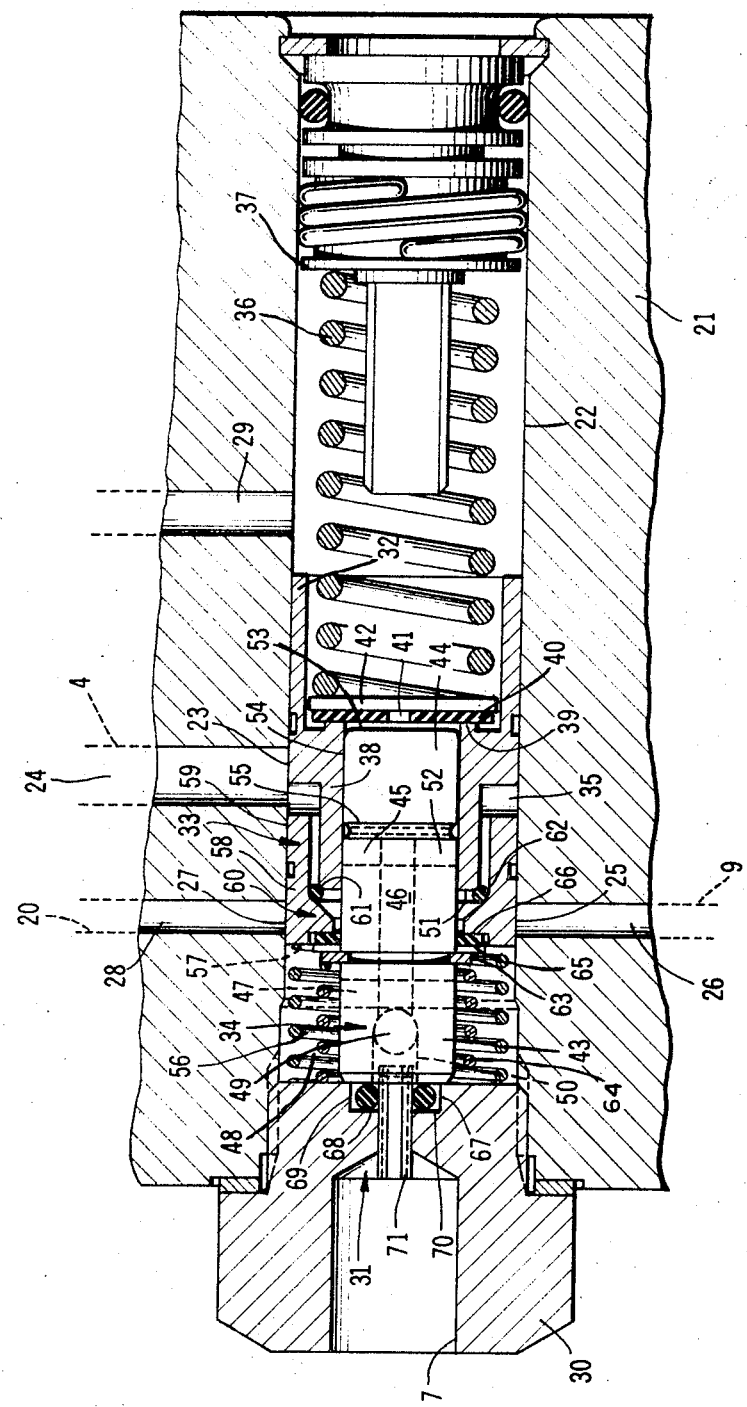

The invention will now be described in more detail by reference to the embodiment illustrated in the drawing, in which:

FIG. 1 is a schematic circuit diagram relating to a fuel oil pump system incorporating the pressure-regulating valve of the invention, FIG. 2 shows a longitudinal section through a preferred embodiment of the pressure-regulating valve of the invention, FIG. 3 is a schematic longitudinal section through a further embodiment, and FIG. 4 is a schematic longitudinal section through a third embodiment.

Referring to FIG. 1, an oil-pump 1 draws oil from a sump 3 by way of a suction pipe 2 and passes it to a supply or pressure pipe 4. At the point 5, the latter pipe divides into a delivery pipe 7, containing a cut-off valve 6 and leading to a fuel nozzle 8, and into a return pipe 9 incorporating a pressure-regulating valve 10. Functionally associated with the pressure pipe 4 is a restrictor 11. The pressure-drop at the restrictor 11, i.e. a function of the quantity of oil flowing, controls the pressure-regulating valve 10, as indicated by the control gear 12 and the impulse lines 13, 14 and 15. Each time the pressure-regulating valve 10 is opened to such an extent that the entire surplus quantity flows away, a constant quantity of oil at constant pressure passes through the delivery pipe. The restrictor itself can be influenced by the supply pressure and, if required, also by the pressure-drop occurring at the restrictor, as indicated by control gear 16 and the impulse lines 17, 18 and 19. Thus, very good constancy in the pressure is achieved in a simple manner at the point 5, i.e., constancy in the quantity of oil in the pipe 7, and instead of passing the returning oil back to the sump 3 (two-line operation), it can also be passed back directly to the suction pipe 2 of the pump by way of a pipe 20 (single-line operation).

In the form of construction shown in FIG. 2, a housing 21 contains a cylindrical bore 22 in the wall of which is the mouth 23 of a bore 24 for the fluid being supplied, the mouth 25 of a bore 26 for the fluid returning to the sump, and the mouth 27 of a bore 28 for fluid to be returned to the suction side of the pump. A further bore 29 communicates with the suction side for relief purposes. One end of the bore is closed by an insert 30, which forms part of the delivery pipe 7 and the seat of a cut-off valve 31, which will be described in more detail later. A setting piston 32 and an annular piston acting as a regulating element and having the same outside diameter are displaceable in the cylindrical bore 22. The regulating element 33 surrounds a closure element 34 which is coupled with regulator element 33 for substantially synchronous movement.

On one side, the setting piston 32 is acted upon by the pressure of the fluid in the chamber 35 and on the other side by the pressure from a rated spring 36 which is supported on an adjustable backing member 37. The setting piston 32 has an extension in the form of a hollow cylinder 38, and on the shoulder 39 so formed there rests a sealing disc 40 having a central hole 41 and a support plate 42, these being pressed by the rated spring 36 against the shoulder so that a transverse base is created in the setting piston 32. In operation, the setting piston 32 occupies a position which is dependent upon the level of the supply pressure and the setting of the rated spring 36.

The closure element 34 forms a closure member 43 at one end and, at the opposite end, a piston 44 which is pushed into the hollow cylinder 38. The closure member contains transverse and longitudinal bores 45, 46 and 47, through which the chamber 35 can communicate with a chamber 48 on the opposite side of the regulating element 33. To simplify manufacture, the longitudinal bore 46 is closed by a sphere 49, so that a recess 50 still remains in the closure member 43.

In the illustrated at-rest position, the end-edge 51 of the hollow cylinder 38, together with the mouth 52 of the transverse bore 45, forms a valve, and in normal operation, when the setting piston 32 has moved to the right, pressurized fluid is admitted to the central bore 46. Between the piston 44 and the sealing disc 40 is a chamber 53, the volume of which is zero in the at-rest position illustrated, since the sealing disc 40 bears against the end-face of the cylinder; (the chamber 53 is only shown as being larger for the sake of greater clarity). When a change occurs in this chamber 53 in the base, oil is fed through the peripheral gap 54, acting as a throttle, from an annular groove 55, which communicates with the mouth 52, or the oil is discharged into this groove. The cushion of oil ensures that the closure element 34 participates in the rapid movements of the setting piston 32, but permits slow relative movement between the two parts.

On one side, the regulating element 33 is acted upon by the pressure in the chamber 35 and on the other by the pressure in the chamber 48 and by the force from a differential pressure spring 56. The differential pressure is produced by the pressure-drop at the restrictor 51, 52. Consequently, the regulating element 33 assumes a position such that its end-edge 57 uncovers a certain cross-section of the mouths 25 and 27 respectively. The regulating element 33 has a long sleeve 58, which overlaps the hollow cylinder 38 of the setting piston 32. Consequently there results a long circumferential gap 59, which enables a good seal between the supply bore 24 and the return bore 28 to be achieved. Also, there is positioned between a base surface 60 of the regulating element and an inclined end-face 61 of the setting piston 32, an O-ring seal 62, which, in the at-rest position illustrated, provides an effective seal, so that in the at-rest position no communication between the supply and return pipes is possible by way of the bores 45 – 47 in the closure element 34 in any circumstance. Also, in particular, it is practically impossible for any entrained air to pass along the two parts indicated.

The closure element 34 follows the movement of the regulating element 33 since it is pressed by a stop 63 on a drive spring 64 against a resilient sealing disc 66, a disc 65 being interposed. This sealing disc prevents fluid from passing between the chambers 35 and 48 by circumventing the restrictor 51, 52, but it permits small relative movement between the regulating element 33 and the closure element 34.

In single-line operation, the bore 26 is closed and in two-line operation it communicates with the return pipe leading to the sump. The bore 28 is always in direct communication with the suction side of the pump, i.e. without a non-return valve being interposed. Even if air is entrained to a greater extent in two-line operation, this is no disadvantage, since the air does not pass preferentially into the bore 28 because of the good seal. Also, the system can also be provided with venting means. It is not always necessary for the bores 26 and 28 to be made to lie precisely opposite each other. Depending upon the required rate of flow, it may be expedient for example to offset the bore 28 from the bore 26 by a distance a, for example 0.2 mm.

The cut-off valve 31 is constituted by the end-face 67 of the closure member 43 and an O-ring 68, the end position being defined by the end-face 69 of the insert. The O-ring 68 is fitted in a groove 70 of considerably greater diameter. It is guided on the clamping pin 71, which is inserted in a bore in the insert 30. The clamping pin can consist for example of a piece of spring sheet bent to cylindrical form. The clamping pin 71 extends into the recess 50 in the closure member 42. Its length is such that the ring 68 cannot fall away during the maximum stroke of the closure element 34, i.e., the distance between the end-face 67 and the clamping pin 71 is less than the diameter of the cross-section of the ring, and preferably less than the radius of the cross-section of the ring. In this arrangement, the ring 68, even if it should be blown out from its at-rest position as illustrated, can move only to a predetermined extent and is always returned to its at-rest position.

The same applies in the case of the sealing ring 62, which is so guided in the sleeve 58 that it cannot be lost since the end-face 51 of the hollow cylinder 38 is always positioned within the axial extent of the sleeve 58.

When the pump is started up and the pump pressure rises, the setting piston 32 is first moved to the right, whereas the regulating piston remains in its at-rest position. After a certain time, the restrictor 51, 52 opens and fluid under pressure passes into the chamber 48. Consequently, the regulating element 33 is also displaced into a position determined by the pressure-drop at the restrictor. The closure element 34 follows this movement, being driven by the spring 64. In this way the aperture size of the restrictor 51, 52 is corrected. A stable operating condition is established. Small fluctuations in pressure bring a rapid response from the regulating element 33, since it is loaded on both sides by fluid in which the pressure differential is small, and the spring 56 can also be relatively weak. If they are very small, these movements of the regulating element will not be transmitted to the closure element 34 because of the resilience of the coupling and the oil-damping in the chamber 53 in the base. Greater pressure-fluctuations can however have a reactive effect on the restrictor 51, 52 by way of the closure element 34. However, if the overall pressure level of the pump changes, the setting piston 32 and, thus, the restrictor are displaced so that completely new conditions of equilibrium result.

If the pump is not switched off, the pressure in the chamber 35 drops and the rated spring 36 pushes the setting piston 32 to the left. Since this happens at considerable speed, the oil in the chamber 53 in the base acts as a transmission means, so that the closure element 34 is driven along and the closure member 43 is pressed on to the seat of the cut-off valve 31. During this movement, the closure member 34 is released from the regulating element 33. During this movement, the closure member 34 displaces fluid in the chamber 48 so that additional pressure is set up there. Consequently, the regulating element 33 is pushed a little to the right, so that the additional pressure can be relaxed without difficulty. By means of the force from the rated spring, all the oil is then expelled from the chamber 53, until finally the at-rest position as illustrated is reached.

FIG. 3 illustrates a construction in which a setting piston 74 and a regulating piston 75 are provided in a housing 72 which is closed at one end by a set-screw 73. The setting piston has a continuation 76 whereby it can act upon the regulating piston 75, and the regulating piston 75 has an extension 77 which acts as the closure member of a cut-off valve for blocking the delivery pipe 7. The chamber 78 between the two pistons communicates with the supply pipe 4. Consequently, the setting piston 74 is acted upon on the one side by the supply pressure and on the other by the pressure from a rated spring 79. The chamber 78 communicates with the chamber 82, positioned at the opposite side of the piston 75, by way of a pipe 80 which contains a fixed restrictor 81. The setting piston 74 overrides, by its edge 83, the mouth 84 of the connecting pipe 80. The regulating piston 75 overrides by its edge 85 the mouth 86 of the return pipe 9. A differential-pressure spring 87 acts upon the regulating piston 75.

In operation, the setting piston 74 is pressed to the left into the chamber 78 by the supply pressure. This can completely uncover the orifice 84; then, only the constant restrictor 81 is effective. The setting piston can however also supplement the restrictor. The regulating piston 75 is acted upon by the pressure-drop at the restrictor and by the spring 87. Consequently, its end-edge 85 overrides the mouth 86 to an extent required for effecting regulation. If the supply pressure drops, the rated spring 79 presses the setting piston 74 and therefore the regulating piston 75 to the right, so that the delivery pipe 7 is blocked.

In the form of construction shown in FIG. 4, a setting piston 90 and an annular regulating piston 91 are again provided in a housing 88, one end of which is closed by a set-screw 89. The supply pressure obtains in the chamber 92 and this pressure is opposed by the rated spring 93. The adjusting piston 90 has an extension 94 in which is contained a passage 95 having a mouth 96. This passage leads to a chamber 97 from which run the delivery pipes 7, and, by way of the mouth 98, the return pipe 9. The end-edge 99 of the regulating piston overrides the mouth 96 and its end-edge 100 overrides the mouth 98. It is also acted upon by the drive spring 101.

In operation, the setting piston again moves into a position that is dependent upon the supply pressure. The regulating piston occupies a position corresponding to the pressure-drop at the restrictor 96, 99. Any pressure fluctuation that occurs acts both over the width of the return opening 9 and over the dimension of the restrictor. In this case, a cut-off valve, independent of the valve construction, is provided in the delivery pipe 7.

In the forms of construction illustrated, the mouths or openings do not always need to be of circular cross-section. It is often advantageous for them to be of a special cross-section so that the required regulating function, i.e., the provision of a substantially constant pressure in the space in front of the cut-off valve, is fulfilled.

We claim:

1. Pressure regulating apparatus comprising a housing having a cylindrical bore, setting and regulating pistons in said bore forming a first chamber between said pistons and a second chamber on the other side of said regulating piston, a rated spring biasing said setting piston in one direction and a differential spring biasing said regulating piston in the opposite direction, a supply inlet in said housing opening into said first chamber between said pistons, a discharge outlet in said housing have fluid communication with said second chamber, restrictor passage means between said chambers, and a return outlet in said housing having fluid communication with said second chamber, said return outlet having a valve opening cooperable with said regulating piston to form a regulating valve, said regulating valve being openable upon movement of said regulating piston in said opposite direction.

2. Pressure regulating apparatus according to claim 1 wherein said restrictor passage means has a valve opening cooperable with at least one of said pistons to form a restrictor valve, said restrictor valve being openable upon movement of at least one of said pistons.

3. Pressure regulating apparatus according to claim 2 wherein said pistons are arranged coaxially with their adjacent ends in part defining said first chamber and with their other two ends being in respective engagement with said rated and differential springs, said restrictor passage means being formed at least in part in one of said pistons.

4. Pressure regulating apparatus according to claim 1 including a closure member cooperable with said discharge outlet to form a cut-off valve, said cut-off valve being biasable in a closing direction by said rated spring.

5. Pressure regulating apparatus according to claim 4 wherein said regulating piston and said closure member have mutually engagable abutment means which form a lost motion coupling therebetween, said regulating piston being movable by said closure member in said opposite direction, said closure member being movable in said one direction by said rated spring independently of said regulating piston.

6. Pressure regulating apparatus according to claim 5 including closure spring means for biasing said closure member in said opposite direction.

7. Pressure regulating apparatus according to claim 5 wherein said abutment means includes a resilient sealing member.

8. Pressure regulating apparatus according to claim 5 wherein said abutment means includes an annularly shaped backing member for said regulating piston, and an annularly shaped seal disposed between said setting piston and said regulating piston.

9. Pressure regulating apparatus according to claim 4 including damping means between said closure member and said setting piston for damping relative movement therebetween.

10. Pressure regulating apparatus according to claim 9 wherein said damping means includes a bore in said setting piston for receving said closure member, said bore being closed at one end to form a damping chamber, means for supplying pressurized fluid to said damping chamber, and throttle means for throttling pressurized fluid supplied to said damping chamber.

11. Pressure regulating apparatus according to claim 10 wherein said closure member has a cylindrically shaped external surface and a clearance is provided between said external surface and said bore surface, said restrictor passage means being formed in said closure member, said clearance providing a throttled fluid communication path between said restrictor passage means and damping chamber.

12. Pressure regulating apparatus according to claim 11 including an annular groove in said closure member external surface, said annular groove having fluid communication with said restrictor passage means to provide pressurized fluid for flow through said clearance to said damping chamber.

13. Pressure regulating apparatus according to claim 10 wherein said bore is closed at one end by a perforate plate, and a supporting plate interposed between said perforate plate and said rated spring.

14. Pressure regulating apparatus according to claim 4 wherein said restrictor passage means is formed in said closure member, said closure member cooperating with said setting piston to vary the flow resistance of said restrictor passage means.

15. Pressure regulating apparatus according to claim 4 wherein said regulating piston has a central bore, said closure member having a cylindrically shaped external surface surrounded by said central bore.

16. Pressure regulating apparatus according to claim 4 including an annularly shaped recess surrounding said discharge outlet, an O-ring disposed in said recess, a central bore in said closure member, and a tube in said discharge outlet surrounded by said O-ring and extending into said closure member bore so as to retain said O-ring during movement of said closure member relative to said discharge outlet.

17. Pressure regulating apparatus according to claim 16 in which said tube forms an axially extending flow passage.

18. Pressure regulating apparatus according to claim 1 wherein said setting and regulating pistons have outside diameters of the same size, said regulating piston having a central bore, said setting piston having an axially extending portion of lesser diameter than said central bore, said axially extending portion being at least partially surrounded by said central bore.

19. Pressure regulating apparatus according to claim 18 wherein said regulating piston has a second bore of smaller diameter than said central bore and an annularly shaped base surface connecting said bores, and an annularly shaped seal pressed against said base surface by said axially extending portion of said setting piston.

20. Pressure regulating apparatus according to claim 1 including a pump suction pipe, and a branch pipe extending from said suction pipe to said return outlet.

21. Pressure regulating apparatus according to claim 1 including a sump, and a return pipe extending from said sump to said return outlet.

* * * * *